(12) United States Patent
Martinsson et al.

(10) Patent No.: US 9,224,995 B2
(45) Date of Patent: Dec. 29, 2015

(54) BATTERY POWERED TOOL AND BATTERY PACK FOR A BATTERY POWERED TOOL

(75) Inventors: Par Martinsson, Jonkoping (SE); Johan Bjornlinger, Jonkoping (SE); Oskar Bergquist, Huskvarna (SE); Mikael Racov, Huskvarna (SE); Johan Svennung, Jonkoping (SE)

(73) Assignee: HUSQVARNA AB, Huskvarna (SE)

( * ) Notice: Subject to any disclaimer, the term of this patent is extended or adjusted under 35 U.S.C. 154(b) by 969 days.

(21) Appl. No.: 13/218,067

(22) Filed: Aug. 25, 2011

(65) Prior Publication Data
US 2011/0308831 A1 Dec. 22, 2011

Related U.S. Application Data

(63) Continuation-in-part of application No. PCT/EP2010/001405, filed on Mar. 6, 2010, and a continuation-in-part of application No. PCT/EP2010/001406, filed on Mar. 6, 2010, and a (Continued)

(51) Int. Cl.
*B25F 5/02* (2006.01)
*H01M 2/10* (2006.01)
*H01M 2/20* (2006.01)

(52) U.S. Cl.
CPC ............ *H01M 2/1055* (2013.01); *B25F 5/02* (2013.01); *H01M 2/204* (2013.01)

(58) Field of Classification Search
CPC ......... B25F 5/02; B23B 45/001; B23B 21/00; Y02E 60/12; H01M 2/105; H01M 2/1077; B27G 19/04; B27B 9/00; B27B 9/02
USPC .............. 173/2, 20, 217; 30/388, 389, 391; 429/96, 97, 99, 100
See application file for complete search history.

(56) References Cited

U.S. PATENT DOCUMENTS 4,084,123 A 4/1978 Lineback et al.
4,555,849 A * 12/1985 Ando et al. ............. 30/388

(Continued)

FOREIGN PATENT DOCUMENTS

EP 205282 5/2002
EP 2080594 7/2009

(Continued)

OTHER PUBLICATIONS

International Search Report of PCT/EP2010/001405 mailed Dec. 6, 2010.

(Continued)

*Primary Examiner* — Nathaniel Chukwurah
(74) *Attorney, Agent, or Firm* — Nelson Mullins Riley & Scarborough LLP

(57) ABSTRACT

A battery pack for powering a battery powered tool may include a housing, a plurality of cells and an electrical connection assembly. The housing may include a sidewall assembly configured to correspond to respective sidewalls of a battery compartment defined at a portion of the battery powered tool to facilitate insertion of the battery pack into the battery compartment. The sidewall assembly may form an enclosure around the plurality of cells on all sides substantially parallel to the direction of insertion. The electrical connection assembly may be disposed at a portion of the sidewall assembly to communicate the combined output to a connector disposed at a corresponding sidewall of the battery compartment. The electrical connection assembly may be arranged to engage the connector responsive to movement of the battery pack in a direction substantially parallel to the direction of insertion of the battery pack into the battery compartment.

26 Claims, 14 Drawing Sheets

Related U.S. Application Data continuation-in-part of application No. PCT/SE2010/050765, filed on Jul. 2, 2010, and a continuation-in-part of application No. PCT/SE2011/050308, filed on Mar. 2, 2011.

(56) References Cited

U.S. PATENT DOCUMENTS

| | | | | |
|---|---|---|---|---|
| 4,847,513 | A | * | 7/1989 | Katz et al. ............... 307/149 |
| 5,578,392 | A | * | 11/1996 | Kawamura ............... 429/99 |
| 5,725,304 | A | | 3/1998 | Inai |
| 6,357,534 | B1 | | 3/2002 | Buetow et al. |
| 6,775,913 | B2 | | 8/2004 | Fey et al. |
| 7,343,683 | B2 | | 3/2008 | Buck et al. |
| 7,581,323 | B2 | * | 9/2009 | Miklosz et al. ............ 30/388 |
| 7,958,642 | B2 | | 6/2011 | Rosskamp |
| 2006/0108981 | A1 | | 5/2006 | Watson |

FOREIGN PATENT DOCUMENTS

| | | |
|---|---|---|
| EP | 223780 | 9/2010 |
| WO | 2007098785 | 9/2007 |

OTHER PUBLICATIONS

International Search Report of PCT/EP2010/001406 mailed Dec. 6, 2010.

* cited by examiner

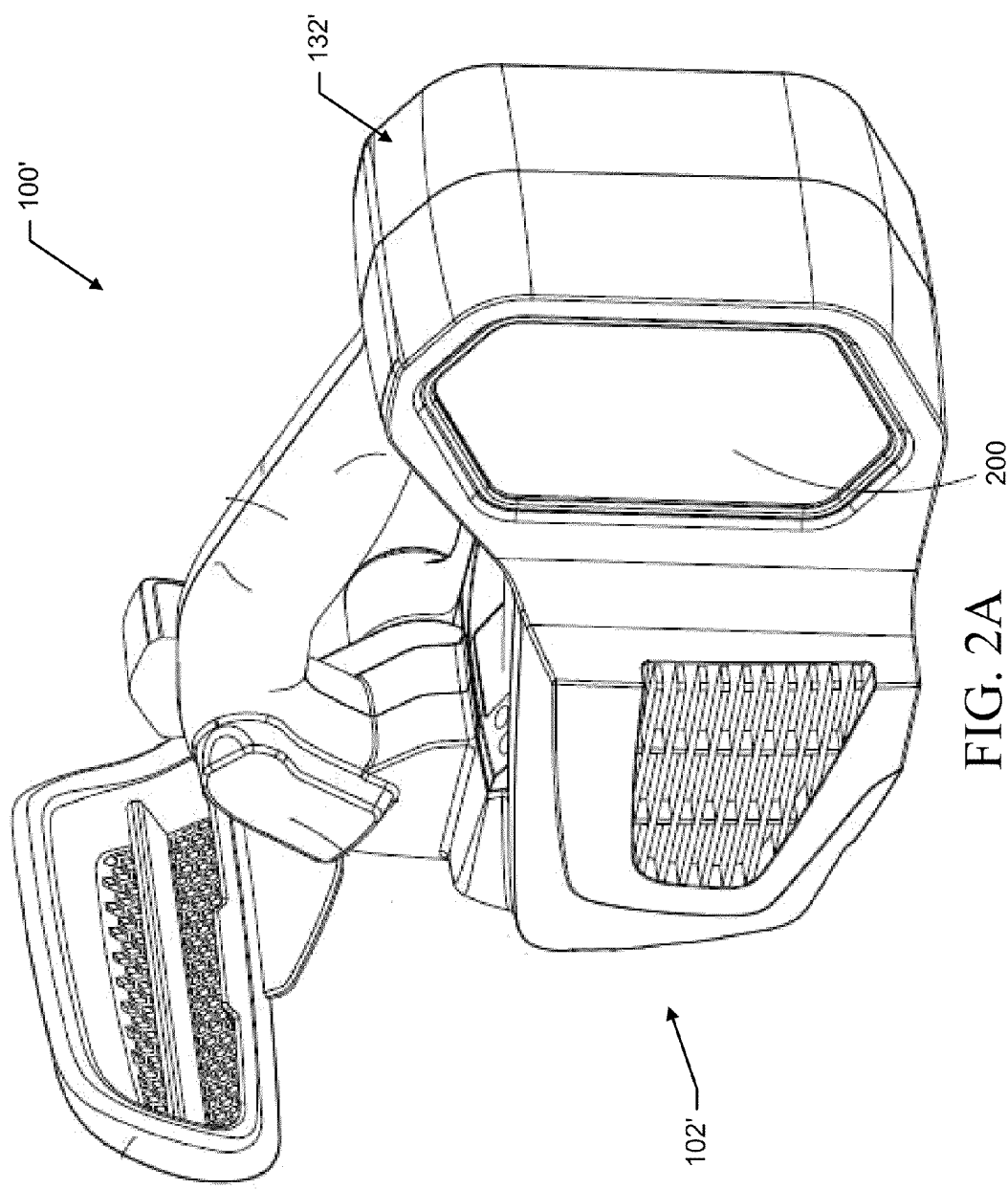

BATTERY POWERED TOOL AND BATTERY PACK FOR A BATTERY POWERED TOOL

CROSS REFERENCE TO RELATED APPLICATIONS

This application is a continuation-in-part of Application No. PCT/EP2010/001405, filed Mar. 6, 2010, and entitled "Battery Housing with Extending Wall", a continuation-in-part of Application No. PCT/EP2010/001406, filed Mar. 6, 2010, and entitled "Additional Housing for Battery", a continuation-in-part of Application No. PCT/SE2010/050765, filed Jul. 2, 2010, and entitled "Battery Powered Tool", and a continuation-in-part of Application No. PCT/SE2011/050308, filed Mar. 2, 2011, and entitled "Optimized Shape of Battery Pack", the contents of each of which are incorporated by reference herein in their entirety.

TECHNICAL FIELD

Example embodiments generally relate to battery powered equipment and, more particularly, relate to hand-held power equipment that is battery powered, and a battery pack for such equipment.

BACKGROUND

Property maintenance tasks are commonly performed using various tools and/or machines that are configured for the performance of corresponding specific tasks. Certain tasks, like cutting trees, trimming vegetation, blowing debris and the like, are typically performed by hand-held tools or power equipment. The hand-held power equipment may often be powered by gas or electric motors. Until the advent of battery powered electric tools, gas powered motors were often preferred by operators that preferred a great deal of mobility. However, as battery technology continues to improve, the robustness of hand-held power equipment that is battery powered has also improved and such devices have increased in popularity.

The batteries employed in hand-held power equipment may, in some cases, be removable and/or rechargeable. The electrical contacts on the battery, and on the equipment itself, may be subject to damage and/or fouling by dirt and debris. Thus, it may be desirable to provide battery designs and battery receptacles that can reduce the likelihood of encountering issues in this regard.

BRIEF SUMMARY OF SOME EXAMPLES

Some example embodiments may provide a battery powered tool or power equipment device that protects the electrical contacts of the battery and/or the tool. The operating life of such devices and their batteries may therefore be increased and the overall performance of such device may be improved.

In one example embodiment, a battery pack for powering a battery powered tool is provided. The battery pack may include a housing, a plurality of cells and an electrical connection assembly. The housing may include a sidewall assembly. The sidewall assembly may be configured to correspond to respective sidewalls of a battery compartment defined at a portion of the battery powered tool to facilitate insertion of the battery pack into the battery compartment. The plurality of cells may be disposed within the housing and arranged adjacent to each other such that the sidewall assembly, which extends along a direction substantially parallel to a direction of insertion of the battery pack into the battery compartment, forms an enclosure around the plurality of cells on all sides substantially parallel to the direction of insertion. The plurality of cells may be electrically connected to each other to provide a combined output. The electrical connection assembly may be disposed at a portion of the sidewall assembly to communicate the combined output to a connector disposed at a corresponding sidewall of the battery compartment. The electrical connection assembly may be arranged to engage the connector responsive to movement of the battery pack in a direction substantially parallel to the direction of insertion of the battery pack into the battery compartment.

In another example embodiment, a battery powered tool is provided. The battery powered tool may include a battery compartment and a connector. The battery compartment may include sidewalls configured to correspond to a sidewall assembly of a battery pack that is insertable into the battery compartment. The battery pack may include a plurality of cells disposed within a housing and arranged adjacent to each other such that the sidewall assembly, which extends along a direction substantially parallel to a direction of insertion of the battery pack into the battery compartment, forms an enclosure around the plurality of cells on all sides substantially parallel to the direction of insertion. The plurality of cells may be electrically connected to each other to provide a combined output. The connector may be disposed at a portion of one of the sidewalls. The connector may be configured to communicate with an electrical connection assembly disposed at the sidewall assembly of the battery pack. The combined output may be electrically communicable from the battery pack responsive to connection of the connector to the electrical connection assembly. The connector is arranged to engage the electrical connection assembly responsive to movement of the battery pack in a direction substantially parallel to the direction of insertion of the battery pack into the battery compartment.

In another example embodiment, a battery powered tool is provided. The battery powered tool may include a battery pack, a battery compartment, a connector and an electrical connection assembly. The battery pack may include a housing at least partially enclosing a plurality of cells disposed within the housing. The plurality of cells may be electrically connected to each other to provide a combined output, the housing comprising a sidewall assembly. The battery compartment may include compartment sidewalls that correspond to the sidewall assembly. The sidewall assembly may extend along a direction substantially parallel to a direction of insertion of the battery pack into the battery compartment to form an enclosure around the plurality of cells on all sides substantially parallel to the direction of insertion. The connector may be disposed at one of the compartment sidewalls. The electrical connection assembly may be disposed at a portion of the sidewall assembly to communicate the combined output to the connector responsive to connection of the connector to the electrical connection assembly via insertion of the battery pack into the battery compartment. The connector may be arranged to engage the electrical connection assembly responsive to movement of the battery pack in the direction of insertion of the battery pack into the battery compartment.

Some example embodiments may improve the performance and/or the efficacy of a battery powered hand-held power equipment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2A illustrates a perspective view of an alternative embodiment of an electric power tool employing a slightly different shaped protection housing according to an embodiment of the present invention;

DETAILED DESCRIPTION

Figure 1A:
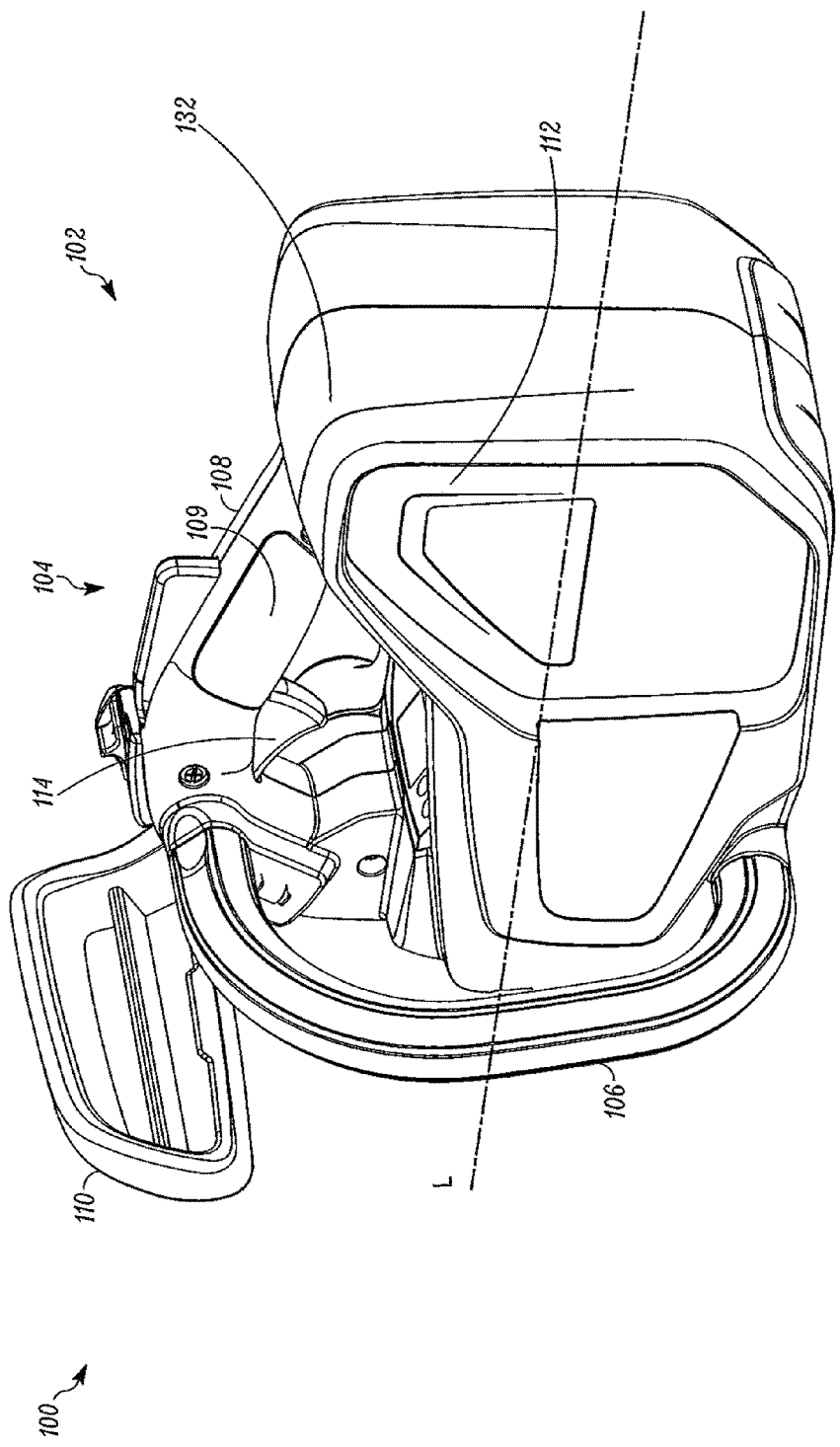
FIG. 1A illustrates a rear perspective view of an electric power tool according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may provide for a battery pack that can be useful in connection with battery powered tools such as hand-held outdoor power equipment. Outdoor power equipment often operates in hostile environments for electrical contacts. In this regard, the work performed by such equipment often generates dust and debris that may foul or interfere with electrical connections. Although many outdoor power equipment devices are now produced with battery packs instead of wired power sources in order to allow operators freedom of movement and reduced operating restrictions, the battery packs may be mated with such devices in a manner that provides crevices or surfaces upon which dust and debris may adhere. A common battery mounting strategy has been to place battery contacts on the bottom of the battery for a battery pack that is inserted into a receptacle in the device being powered. In such an arrangement, the contacts for the device may be protected due to their location in the receptacle. However, the battery contacts themselves may be subject to increased exposure to both dirt and damage in such an arrangement. Furthermore, outside of the receptacle, if the battery contacts are on an end portion of the battery pack, and especially if they are placed near an edge/corner (i.e. where two walls meet), they may be more susceptible to damage or debris if, for example, the battery pack is dropped. To provide less opportunity for dust and debris to interfere with battery contacts, some example embodiments may provide for a battery pack that is insertable into an aperture that has sidewalls that correspond to the sidewalls that define the battery pack. Moreover, the battery contacts may be on a side portion of the battery pack instead of at an end portion thereof. Electrical contacts associated with the electrical connection assembly of the battery pack may be arranged to engage a connector disposed on a sidewall of the aperture. As such, for example, the electrical connection assembly may engage the connector responsive to movement of the battery pack in a direction substantially parallel to a plane in which the corresponding sidewall having the connector lies. The battery contacts and the contacts of the device may therefore both be protected from dust and debris, and from impact.

Figure 1B:
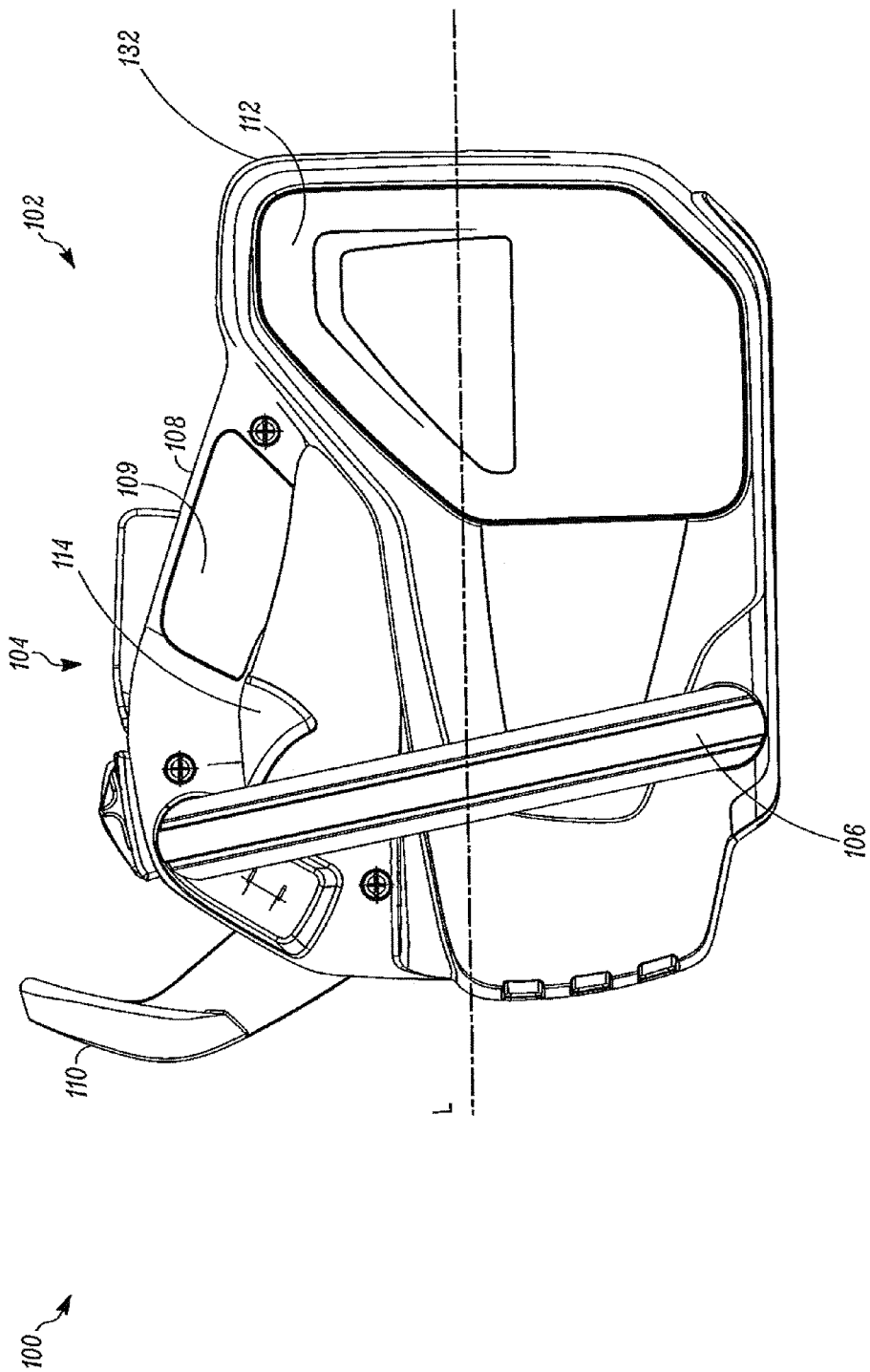
FIG. 1B illustrates a side elevation view of the electric power tool according to an example embodiment.

FIGS. 1A and 1B illustrate two views of an example chain saw, according to an embodiment of the present invention. The chain saw (hereinafter referred to as the "electric power tool 100") may be used in gardening or forestry applications. However, the present invention may also be used in any other battery powered equipment, for example, line trimmers, hedge trimmers, blowers, drills, reciprocating saws, rotary saws, power screw drivers, or other cutting or pruning tools without departing from the essence of example embodiments of the present invention. In addition, any suitable size, shape or type of elements or materials could be used. Further, as used herein, the terms "longitudinal direction" and "transverse direction" indicate a direction relative to the electric power tool 100. The term "longitudinal direction", without further specificity, is a reference to a direction parallel to a longitudinal axis L of the electric power tool 100. The term "transverse direction", without further specificity, is a reference to a direction perpendicular to the longitudinal axis L when viewed from the top, i.e., substantially perpendicular to the plane of the paper in a side view. The terms "front side" and "rear side" of any component or portion of the electric power tool 100 may in general refer to sides of the component or portion that are substantially along the longitudinal axis L, the "front side" being further from a user than the "rear side" during operation of the electric power tool 100. The terms "top side" and "bottom side" of any component or portion may in general refer to sides substantially perpendicular to the longitudinal axis L, the "top side" and the "bottom side" being at the top and the bottom sides of the component or portion respectively.

The electric power tool 100 of this example embodiment includes a tool body 102 and working implements (not shown). The tool body 102 may include a handle section 104 to enable a user to hold and manipulate the electric power tool 100. In an example embodiment of the present invention, the handle section 104 may include a front handle 106 and a rear handle 108. The rear handle may include a grip portion 109 to aid in manual grasping of the electric power tool 100. The front handle 106 and the rear handle 108 may include vibration absorbing means, such as springs, one or more rubber members, or the like. A guard 110 may be present to safeguard a user during operation of the electric power tool 100.

In an embodiment of the present invention, the working implements may include a toothed chain supported on a guide bar.

As shown in FIGS. 1A and 1B, the battery pack 112 may be located backwards of the handle section 104 along the longitudinal axis L. In other embodiments of the present invention, only some portions of the battery pack 112 may be located backwards of the handle section 104 along the longitudinal axis L whereas one or more portions of the battery pack 112 may be located substantially in the transverse direction with respect to the handle section 104. In still other embodiments, the battery pack 112 may be located between two handle sections or at any other suitable location on the tool body 102. In an embodiment of the present invention, the battery pack 112 may be detachably attached to the tool body 102 of the electric power tool 100 to aid in charging, maintenance, and/or storage. However, in other example embodiments of the present invention, the battery pack 112 may be fixedly attached to the electric power tool 100. In an example embodiment of the present invention, the battery pack 112 may include at least one handle (not shown) to aid in manual handling of the battery 112 pack.

Figure 1C:
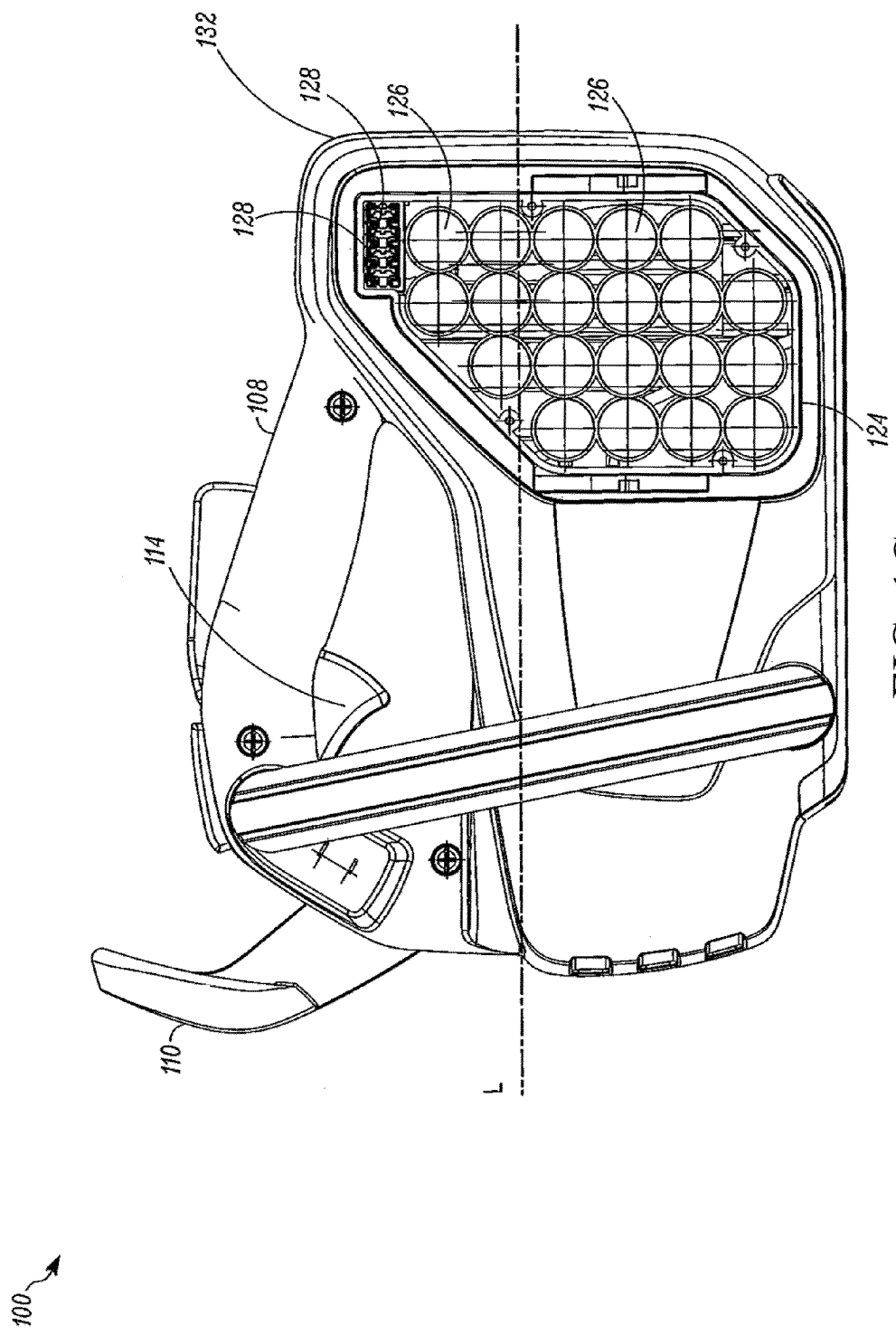
FIG. 1C illustrates a sectional view of the electric power tool according to an embodiment of the present invention.

FIG. 1C illustrates a sectional view of the electric power tool 100, according to an embodiment of the present invention. The battery pack 112 includes a cell housing 124 which may encase one or more battery cells 126. Though in the example embodiment, the battery cells 126 are shown to be stacked substantially parallel to each other in multiple columns, other configurations can be envisioned without departing from the essence of the present invention. The one or more battery cells 126 may be rechargeable Lithium-Ion cells. Inner surfaces of the cell housing 124 may include electrical conductors to connect poles of the one or more battery cells 126 to one or more electric contacts 128. The one or more electric contacts 128 may extend at least partially in the transverse direction. In an embodiment of the present invention, the one or more electric contacts 128 may engage with corresponding electrical contacts provided in the tool body 102 to form electrical connections. The battery pack 112 may also include at least one mechanical mating surface (not shown) to mechanically connect the battery pack 112 to the tool body 102 of the electric power tool 100. The mechanical mating surface may include suitable releasable mechanical connections, for example, but not limiting to, snap-fit connections, mating recesses and grooves, connections with resilient members (e.g., springs), or a combination of any of these.

In an embodiment of the present invention, a protection housing 132 (e.g., a battery compartment) may be provided to safeguard the battery pack 112 against mechanical shocks and external elements, such as moisture, particulate matter, etc. As shown in FIGS. 1A-1C the protection housing 132 may enclose the battery pack 112 at least partially on all of the sides of the battery pack. In this regard, the sides of the battery pack 112 should be understood to correspond to walls of the cell housing 124 that lie substantially parallel to a direction of insertion of the battery pack 112 into the protection housing 132. End walls should be understood to correspond to walls of the cell housing 124 that lie in a plane that is perpendicular to the direction of insertion of the battery pack 112 into the protection housing 132. The protection housing 132 may have various configurations without departing from the essence of example embodiments of the present invention, for example, but not limiting to, a one-piece configuration, a modular configuration with one or more shells, or the like. In an example embodiment of the present invention, the protection housing 132 may be integrally formed with the tool body 102 of the electric power tool 100. In another example embodiment of the present invention, the protection housing 132 may be separately formed and then attached to the electric power tool 100. The protection housing 132 may also be detachably attached to the tool body 102 to aid in repair or maintenance. The protection housing 132 may be manufactured by various processes, such as molding, forming, machining, or the like.

The protection housing 132 may be made of a suitable material, such as metal or plastic. In another example embodiment of the present invention, the protection housing 132 may include suitable sealing members (e.g., sealing rings) to impede the entry of moisture, particulate matter, etc., thereby protecting the electrical contacts of the battery pack 112 and/or the tool electrical contacts from erosion or short circuit. The protection housing 132 may further include one or more openings (not shown in the figures) to improve the ventilation of the battery pack 112. The openings may be selectively opened or closed depending on various parameters, such as ambient temperature, ambient humidity or moisture conditions (e.g., rain), etc. The protection housing 132 may also include shock absorbing members (not shown in the figures), for example, rubber pads, springs, etc.

Figure 2B:
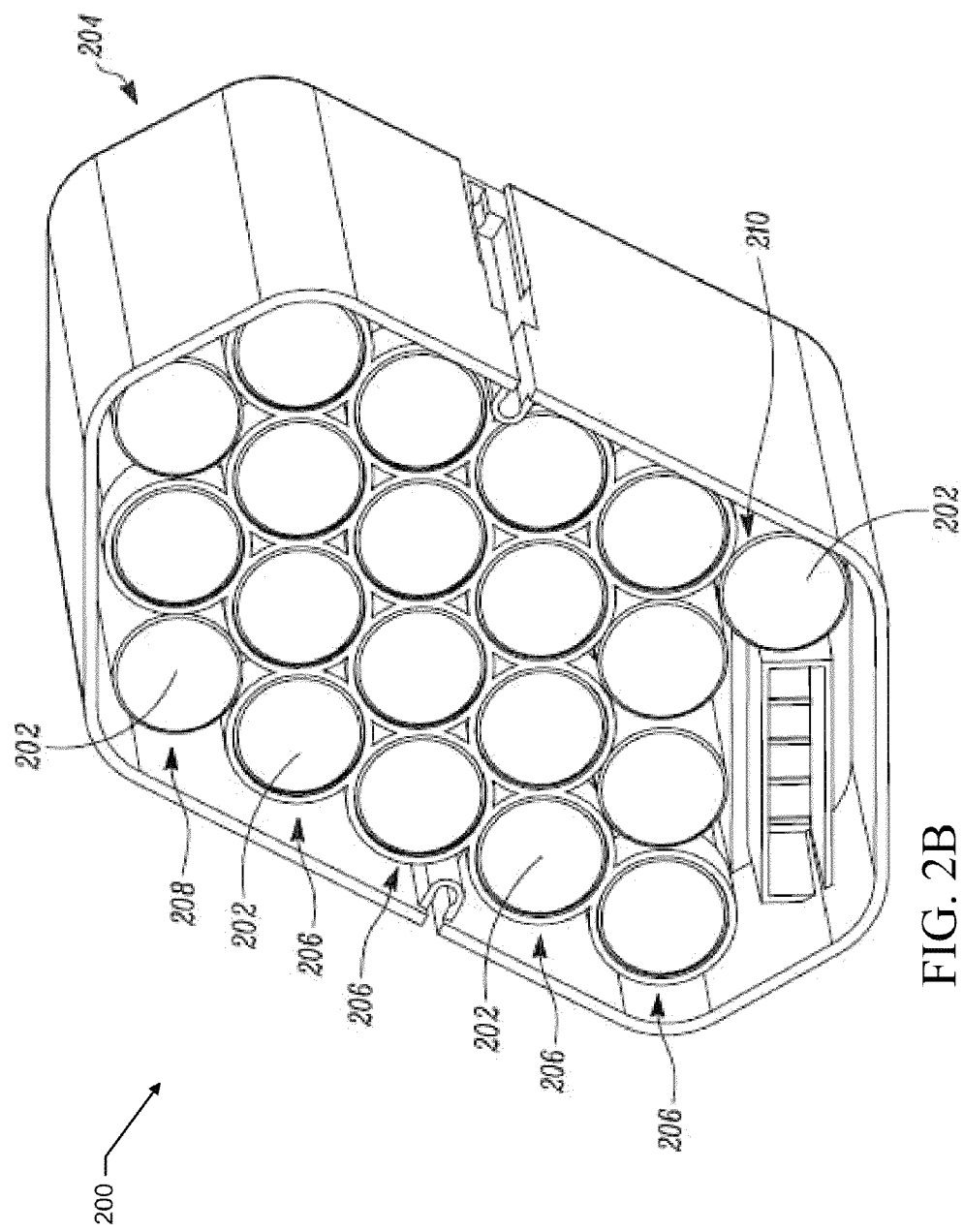
FIG. 2B illustrates a perspective view of a battery pack according to an example embodiment.

FIG. 2A illustrates a perspective view of an alternative embodiment of an electric power tool 100' employing a slightly differently shaped protection housing 132'. In this regard, the protection housing 132' of FIG. 2A is substantially shaped as a parallelogram to support a battery pack having a corresponding shape. FIG. 2B illustrates a perspective view of a battery pack 200 that is an alternative example embodiment of the battery pack 112 of FIG. 1. FIG. 2B shows the battery pack 200 with a cover of the battery pack 200 removed. The battery pack 200 may be detachably removable from the tool body 102' of the electric power tool 100' to aid in charging maintenance and/or storage. The battery pack 200 may include a plurality of battery cells 202 in a slightly different arrangement than the cells 126 shown in FIG. 1. The cells 202 may be encased in a battery housing 204. Each of the cells 202 may have a substantially cylindrical shape. However, any other shape of the cells 202 (for example, cells with an elliptic or rectangular cross-section) may be possible. Moreover, the cells 202 may be, for example, Lithium-Ion, Nickel-Cadmium, or other like based cells. The number and type of the cells 202 may be selected based on various parameters, such as, but not limited to, power and charge requirements, cost, weight and dimensions of the electric power tool 100'.

As illustrated in FIG. 2B, the cells 202 may be arranged in at least two rows 206 with at least two cells 202 in each of the rows 206. Further, the battery pack 200 may include at least one end row 208 or 210 provided as the last row of the cells 202 on top and/or below the rows 206. Notably, the terms "top" and "below" are used herein with respect to the orientation of the battery pack 200 as depicted in FIG. 2B. Further, the end row 208 may include at least one cell 202 less than each of the rows 206. Moreover, at least one of the end rows 208 and/or 210 may include more than one cell 202 less than each of the rows 206. By way of example only, as illustrated in FIG. 2B, each of the rows 206 may include four cells 202. Moreover, the end row 208 provided at the top of the rows 206 may include three cells 206 while the end row 210 provided below the rows 206 may include three cells 202 while the end row 210 provided below the rows 206 may include one cell 202. The number of cells 202 and the number of rows 206, as illustrated in FIG. 2B, are for illustrative purposes only, and the battery pack 200 may include any number of cells 202 arranged in any number of rows 206 within the scope of example embodiments of the present invention. In various alternative example embodiments, two or more cells 202 may also be arranged adjacent to one another in a direction substantially perpendicular to the common plane in which the cells 202 of FIG. 2B lie. Further, each of the rows 206, and/or end rows 208 and 210 may be displaced relative to the closest row such that the battery pack 200 has a substantially parallelogram shaped cross-section (described in greater detail in relation with the description of FIG. 2C). The parallelogram shaped cross-section of the battery pack 200 may lead to a compact arrangement of the cells 202. Such a compact configuration of the battery pack 200 may improve the handling and the ergonomics of the electric power tool 100'. Further, the end rows 208 and/or 210 are provided with at least one cell 202 less than each of the rows 206 to result in a more compact configuration of the battery pack 200 (explained below in conjunction with the description of FIG. 2C).

Figure 2C:
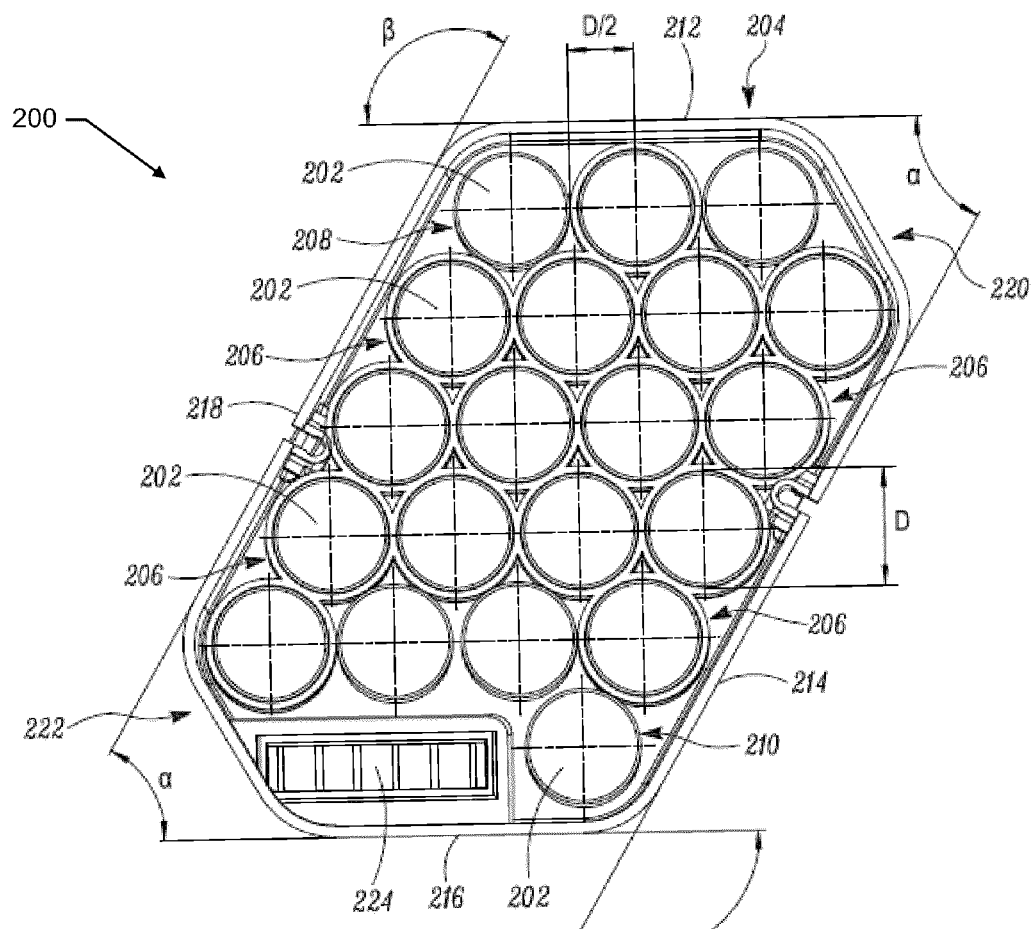
FIG. 2C illustrates a sectional view of the battery pack according to an example embodiment.

FIG. 2C illustrates a sectional view of the battery pack 200 according to an example embodiment of the present invention. As illustrated in FIG. 2C each of the cells 202 may have a diameter D. Further, each of the rows 206, and the end rows 208 and 210 may be displaced relative to the closest row by substantially a distance equal to about half of the diameter D of a cell 202, i.e. D/2. Such a structure may result in formation of a substantially parallelogram shaped cross-section of the battery pack 200. Further, the relative displacement by the distance equal to about D/2 provides an optimum arrangement of the cells 202, i.e., a maximum number of cells 202 can be accommodated in a given volume of the battery pack 200. Consequently, an output power of the battery pack 200 may be maximized for a given volume or size of the battery pack 200.

Further, as illustrated in FIG. 2C, two sides 212 and 216 of the battery housing 204 may be substantially parallel to each other and two sides 214 and 218 of the battery housing 204 may be substantially parallel to each other. As illustrated in FIG. 2C, the two sides 212 and 214 of the battery housing 204 form an angle α between them. Moreover, an angle between the sides 216 and 218 may be substantially equal to the angle α due to the parallelogram shaped cross-section of the battery pack 200. In an example embodiment of the present invention, the angle α may lie substantially in a range from about 30 degrees to 80 degrees. Further, as illustrated in FIG. 2C, the two sides 212 and 218 of the battery housing 204 form an angle β between them. Moreover, an angle between the sides 214 and 216 may be substantially equal to the angle β due to the parallelogram shaped cross-section of the battery pack 200. In an example embodiment of the present invention, the angle β may be substantially in a range from about 100 degrees to 150 degrees. The ranges of the angles α and β may result in a more compact configuration of the battery pack 104. However, it may be apparent to a person skilled in the art that the ranges of the angles α and β are purely exemplary in nature and the angles α and β may have any values without departing from the essence of the present invention. Moreover, the sides 212, 214, 216 and 218 of the battery housing 204 may be of any length or thickness.

Further, the cells 202 in the end row 208 may be arranged such that the parallelogram shaped cross-section of the battery pack 200 may be provided with a first truncated corner 220 between the sides 212 and 214 of the battery housing 204. By way of an example, the end row 208 has at least one cell 202 less than each of the rows 206 to enable the formation of the first truncated corner 220. Further, the cells 202 in the end row 210 are arranged such that the parallelogram shaped cross-section of the battery pack 200 is provided with a second truncated corner 222 between the sides 216 and 218. By way of an example, the end row 210 has at least one cell 202 less than each of the rows 206 to result in the formation of the second truncated corner 222. The first truncated corner 220 and/or the second truncated corner 222 may result in an even more compact configuration of the battery pack 200 by removing at least one sharp corner from the parallelogram shaped cross-section of the battery pack 200.

As illustrated in FIG. 2C, the end row 210 of the battery pack may include an electrical connection assembly 224 which may, in this example, be situated within the battery housing 204. By way of an example, the electrical connection assembly 224 may be accommodated within the battery housing 204 by providing the end row 210 with at least two cells 202 less than each of the rows 206. The electrical connection assembly 224 may include one or more terminals made of an electrically conducting material. The electrical connection assembly 224 may electrically connect the cells 202 to one or more tool electric terminals provided on the main body 102 of the chainsaw 100. Further, the battery pack 200 may include one or more electrical conductors (not shown in the figures) to electrically connect poles of the cells 202 to the electrical connection assembly 224. Moreover, the electrical connection assembly 224 may also be utilized to charge the cells 202 from an external power source. By providing the electrical connection assembly 224 inside the battery housing 204, instead of mounting the electrical connection assembly 224 on an outer surface of the battery housing 204, the battery pack 104 may be more compact. Additionally, the electrical connection assembly 224 may be safeguarded from corrosive elements (For example, moisture) and mechanical damage during handling.

Figure 3A:
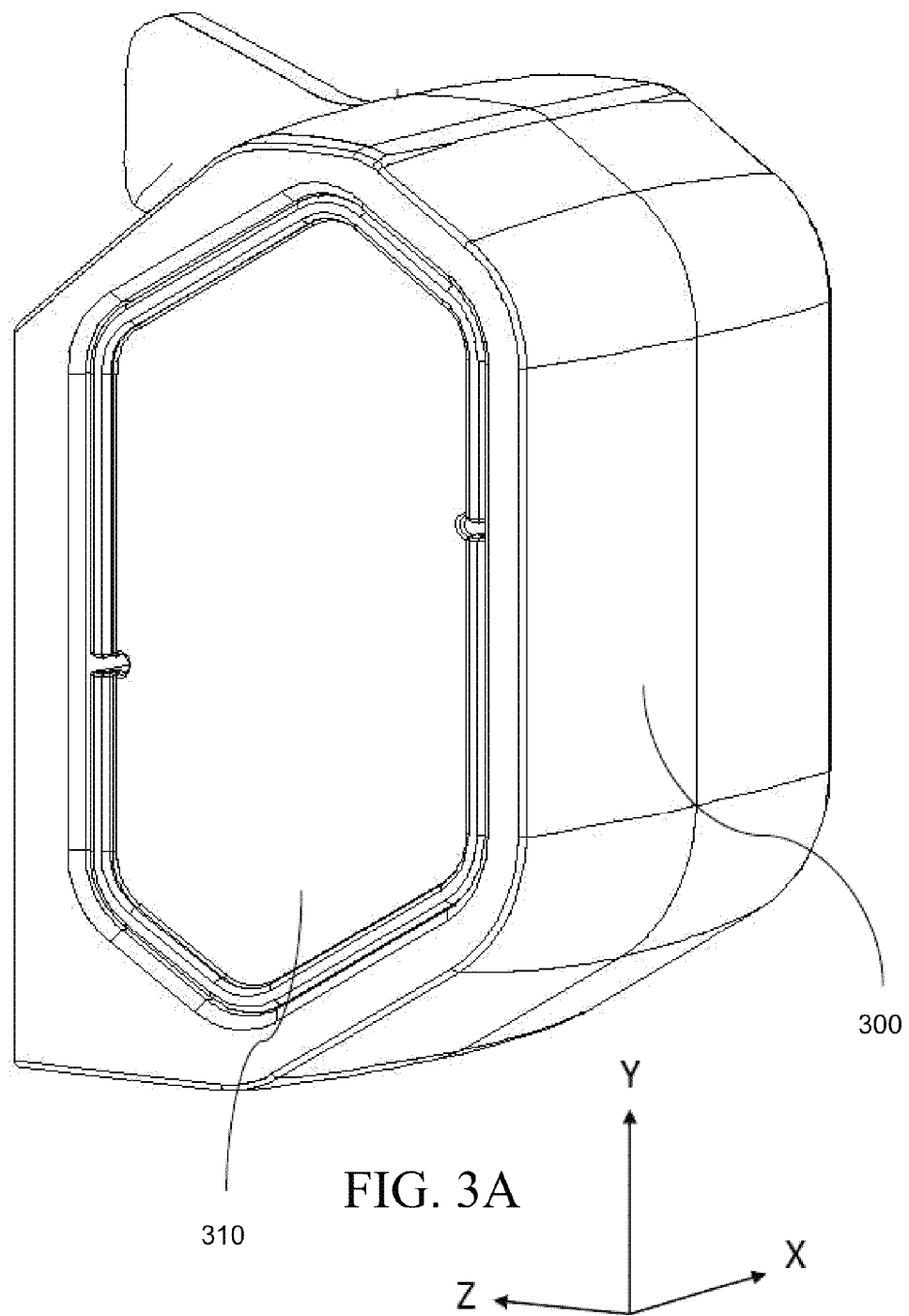
FIG. 3A illustrates an example of a tool body with a through aperture according to an example embodiment.
Figure 3B:
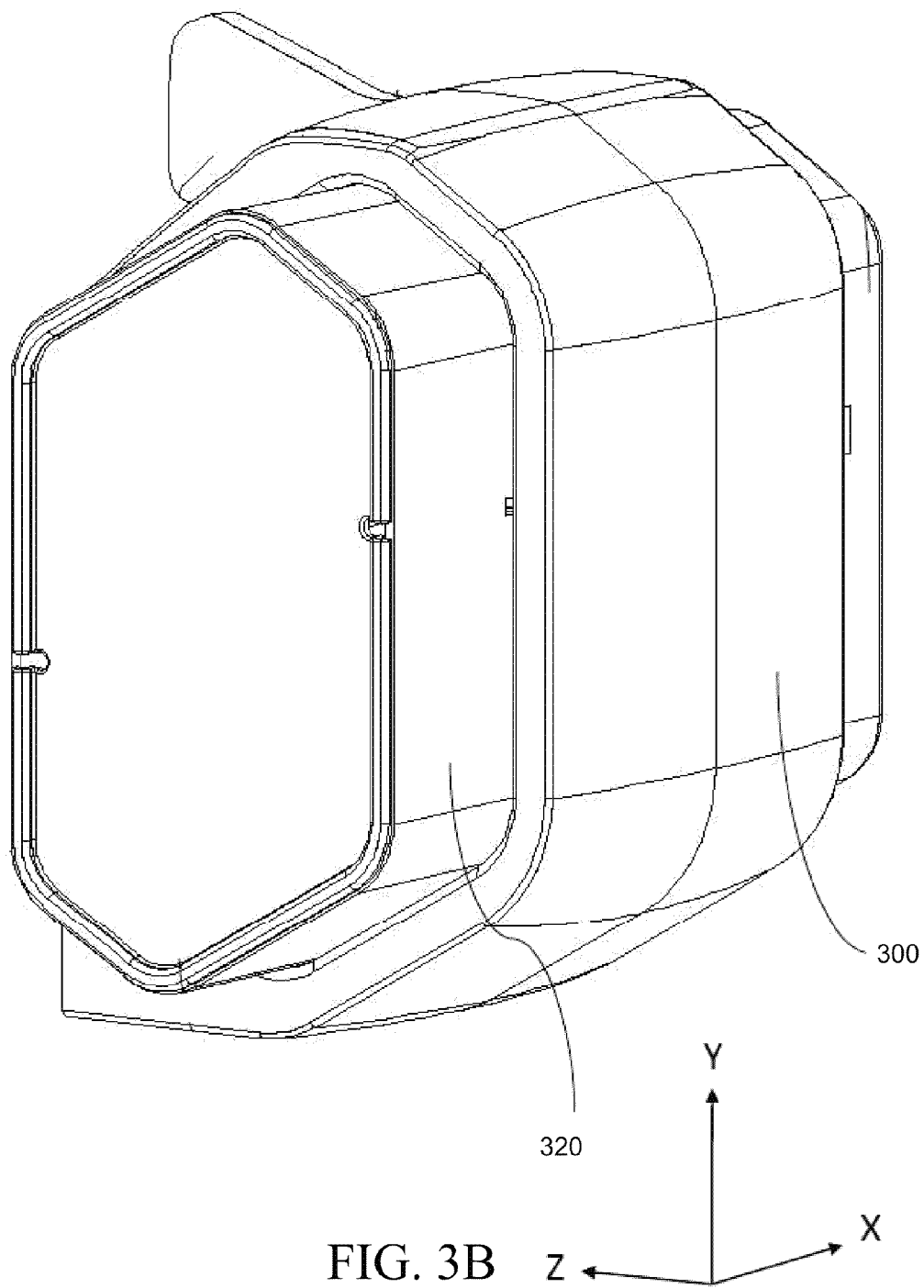
FIG. 3B illustrates a battery pack placed in the through aperture to power the corresponding power tool where opposite ends of the battery pack are exposed according to an example embodiment.

In some embodiments, a battery pack similar to the battery packs 112 or 200 described above may fit within a protection housing, or battery compartment, that is provided as a through aperture. In other words, in some cases, the battery pack may mate with an electric power tool that has a protection housing that is formed as an aperture that passes entirely through the tool body (e.g., 102 or 102'). Thus, for example, opposing ends of the battery pack that define faces lying parallel to each other and each connect to respective opposite ends of sidewalls (e.g., sides 212, 214, 216 and 218) of the battery pack may be exposed at each of the opposing ends of the through aperture. FIG. 3D illustrates an example of a tool body 300 with a through aperture 310. In some embodiments, a battery pack 320 (shown in FIGS. 3A and 3B) may be placed in the through aperture 310 to power the corresponding power tool and opposite ends of the battery pack 320 may be exposed. The opposite ends of the battery pack 320 may extend to be substantially even with edges of the through aperture 310 in some case (see FIG. 3B). However, some alternative embodiments provide for extension of the battery pack 320 out of the through aperture 310 at each of the ends of the battery pack 320.

It should also be appreciated that some embodiments may be practiced in relation to an aperture that is not necessarily a through aperture. Moreover, whether a through aperture or an aperture that does not penetrate entirely through the tool body 300 is used, it should be appreciated that an orientation of any such aperture may not necessarily be limited to a right to left (or vice versa) orientation. Instead, for example, a top to bottom, or bottom to top orientation for the aperture could be employed in some example embodiments.

Figure 3C:
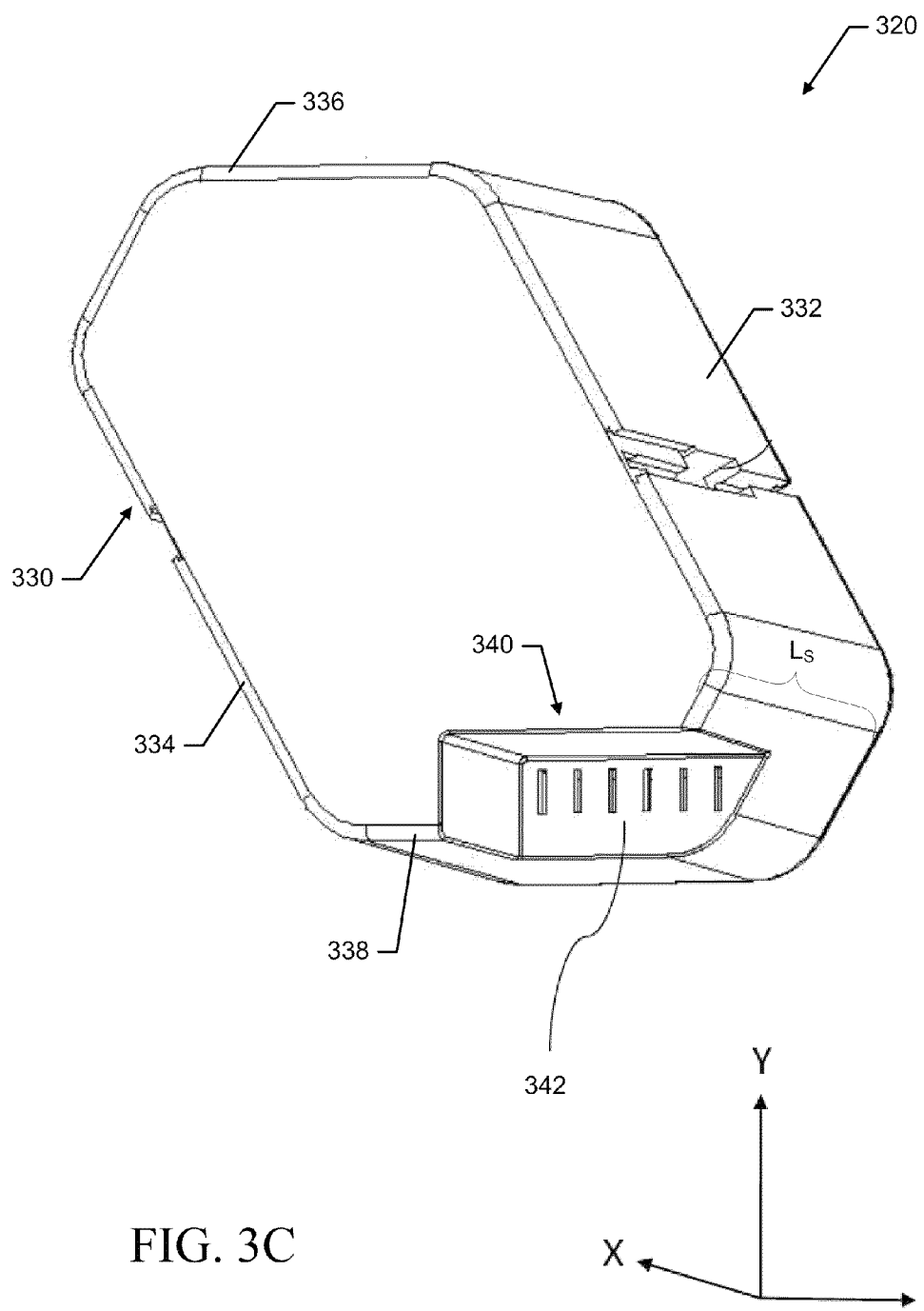
FIG. 3C illustrates a perspective view of the battery pack according to an example embodiment.
Figure 3D:
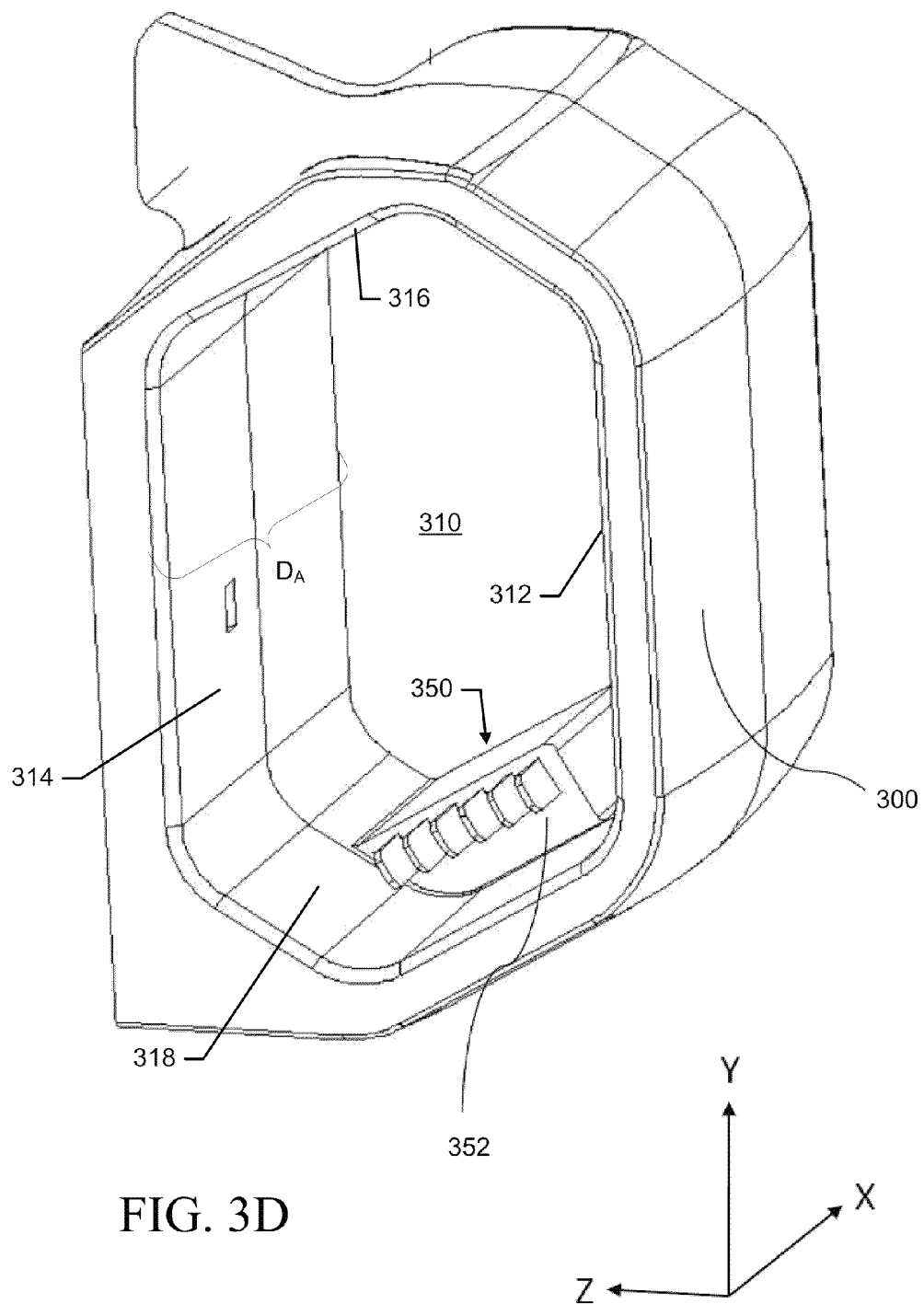
FIG. 3D illustrates a perspective view of the through aperture in the tool body according to an example embodiment.

FIG. 3C illustrates a perspective view of the battery pack 320 according to an example embodiment. FIG. 3D illustrates a perspective view of the through aperture 310 in the tool body 300 according to an example embodiment. In an example embodiment, the battery pack 320 of FIG. 3C may include a housing 330 in which a plurality of cells (not shown) may be disposed. The housing 330 may be defined by a sidewall assembly. In some embodiments, the sidewall assembly may include at least four sidewalls (e.g., sidewall 332, 334, 336 and 338). In some embodiments, the sidewalls may each be substantially rectangular shaped members that are disposed such that an end of each of the sidewalls is joined to an adjacent sidewall end. Moreover, opposite ends of each sidewall may be joined to respective adjacent sidewall ends to form a closure having substantially a rectangular shape or parallelogram shape. In such an embodiment, each sidewall may have an opposing sidewall corresponding thereto such that the opposing sidewalls lie in planes that are parallel to each other. However, in some cases, one or more of the sidewalls may be bent to form different shapes. For example, FIG. 3C shows sidewall 332 and 334 each having substantially rectangular shapes and being disposed in planes that lie parallel to each other. However, sidewalls 336 and 338 each have a bend disposed therein such that corresponding faces on either side of the bent portion of each of the sidewalls 336 and 338 are substantially parallel to each other to provide a parallelogram shape for the housing 330. In some alternative embodiments, the sidewall assembly may include a single sidewall component that is curved to form a ring or oval shaped that surrounds the cells of the battery pack 320. As such, the sidewall assembly may have any number of component sidewalls and may take any suitable shape (e.g., circular, oval, rectangular, square, hexagonal, octagonal, and/or the like) that may be regular or irregular. However, in some example embodiments, the sidewall assembly may be arranged to surround the cells of the battery pack 320 such that any component sidewalls of the sidewall assembly are disposed to extend in a direction that is substantially parallel to the direction of insertion of the battery pack 320 into the tool body 310. End walls that may cover opposite ends of the sidewall assembly to complete enclosure of the cells of the battery pack 320 may lie in a plane that is substantially perpendicular to the direction of insertion of the battery pack 320 into the tool body 310.

The cells of the battery pack 320 may each be electrically connected to each other (e.g., in series or in parallel) and a combined output of the cells may be provided to an electrical connection assembly 340. The electrical connection assembly 340 may therefore form an electrical connection device via which a combined electrical output of the battery pack 320 may be provided to an external device (e.g., the tool powered by the battery pack 320) or via which the cells of the battery pack 320 may be charged from an external power source.

In an example embodiment, the electrical connection assembly 340 includes a series of receptacles for receiving protruded members of a corresponding electrical connector 350 of the tool body 300, which is shown in FIGS. 3C and 3D. The electrical connection assembly 340 may therefore be positioned at an exterior portion (e.g., outside of the housing 330) of the sidewall assembly at a component sidewall (e.g., at sidewall 338) at which the electrical connection assembly 340 is located. Moreover, in some examples, the electrical connection assembly 340 may be positioned in a recess 342 or cutout portion of the corresponding component sidewall of the sidewall assembly (e.g., sidewall 338) at which the electrical connection assembly 340 is located. The recess 342 may be shaped to mate with a corresponding block 352 from which the protrusions of the electrical connector 350 may extend. The provision of the recess 342 and corresponding block 352 may enable the protrusions and corresponding receptacles to be oriented in the direction parallel to the direction of insertion of the battery pack 320 into the through aperture 310 while respective faces of the recess 342 and block 352 from which the receptacles and protrusions extend may lie parallel to each other, but perpendicular to the direction of insertion. The respective faces may therefore prevent movement of the battery pack 320 completely through the through aperture 310 and assist with holding the battery pack 320 in the through aperture 310. In an example embodiment, the respective faces may be positioned to mate with each other at a position relative to the depth of the aperture 310 that is between about 25% and 75% of full depth of the aperture (represented by $D_A$ in FIG. 3D) measured in the X-direction. Moreover, in some cases, the electrical connection assembly 340 (and the corresponding face of the recess 342) may be disposed along the sidewall assembly at a position about 25% to 75% of the full length of the sidewall assembly (represented by $L_S$ in FIG. 3C) measured in the X-direction. In some embodiments, the electrical connection assembly 340 may actually be positioned at a location between ⅓ and ⅔ of the full length of the sidewall assembly, or even at a midway point of the full length of the sidewall assembly as shown in FIG. 3C. Furthermore, the provision of the block 352 along one of the sidewalls of the aperture 310 makes the corresponding sidewall on which the block 352 is disposed differently shaped than the other sidewalls.

However, in alternative embodiments, the electrical connection assembly 340 may include protruded members and the electrical connector 350 of the tool body 300 may include corresponding receptacles. In still other alternative embodiments, rather than providing a series of receptacles and protruded members as few as a single receptacle and protruded member may be employed. In still other embodiments, the electrical connection assembly 340 may simply be one or more electrical contacts disposed on one of the sidewalls of the housing 330.

As shown in FIG. 3D, the through aperture 310 may also include sidewalls (e.g., sidewalls 312, 314, 316 and 318), each of which may correspond to a respective one of the sidewalls (332, 334, 336 and 338) of the housing 330. As such, the sidewalls of the through aperture 310 (e.g., sidewalls 312, 314, 316 and 318) may each have a shape that corresponds to a respective one of the sidewalls (332, 334, 336 and 338) of the housing 330. Moreover, the electrical connector 350 in the aperture 310 may be positioned at one of the sidewalls of the through aperture (in this example sidewall 318) that corresponds to the sidewall of the housing 330 (in this example sidewall 338) on which the electrical connection assembly 340 is located.

As can be seen from FIGS. 1C, 2B, 2C, 3A, 3B, 3C and 3D, there are various alternatives for connecting the battery pack to the electrical connector of the power tool. In this regard, for example, the electrical connection assembly of the battery pack may be internal to the battery pack housing or external to the battery pack housing. However, the electrical connection assembly and the electrical connector may, in each of these example embodiments, be provided on corresponding sidewalls such that the electrical connection assembly is arranged to engage the electrical connector responsive to movement of the battery pack in a direction of insertion that is substantially parallel to the planes in which the sidewalls that include the electrical connection assembly and the electrical connector lie when the battery pack is inserted into the power tool. In some cases, the electrical connection assembly may include protrusions or receptacles that lie in a plane substantially parallel to the direction of insertion, but extend from faces that lie in planes that are parallel to each other and perpendicular to the direction of insertion, so that mating with corresponding receptacles or protrusions of the electrical connector may be facilitated. Moreover, this orientation may further facilitate holding the battery pack within the protection housing of the power tool (e.g., even in cases where a through aperture is employed).

In some embodiments, the electrical connection assembly and the electrical connector may mate with each other at a position relative to the depth of the aperture that is between about 25% and 75% of full depth of the aperture. Moreover, in some cases, the electrical connection assembly may be disposed along the sidewall assembly a position about 25% to 75% of the full length of the sidewall assembly. In some embodiments, the electrical connection assembly may actually be positioned at a location between ⅓ and ⅔ of the full length of the sidewall assembly, or even at a midway point of the full length of the sidewall assembly. This positioning of the electrical connection assembly may make it more difficult for the electrical connection assembly to be damaged or pick up dust or dirt if the electrical connection assembly should fall to the ground for any reason.

In some example embodiments, the battery housing may include a sidewall assembly that encloses a plurality of cells. The cells may be arranged adjacent to each other such that the sidewall assembly forms an enclosure around the plurality of cells on all sides substantially parallel to the direction of insertion. The sidewall assembly may extend along a direction substantially parallel to a direction of insertion of the battery pack into the battery compartment. In this regard, the sidewalls of the sidewall assembly may each be parallel to the direction of insertion. However, in some cases, the sidewalls may have a small angle that tapers the housing from one end wall of the housing toward the other end wall. In the context of the present application, both embodiments that are perpendicular to the direction of insertion and those that employ sidewalls that taper slightly fall within the scope of being substantially parallel to the direction of insertion. Furthermore, it should be appreciated that the enclosure of some example embodiments may include vent holes and/or other discontinuous features disposed within sidewalls of the enclosure.

Figure 4A:
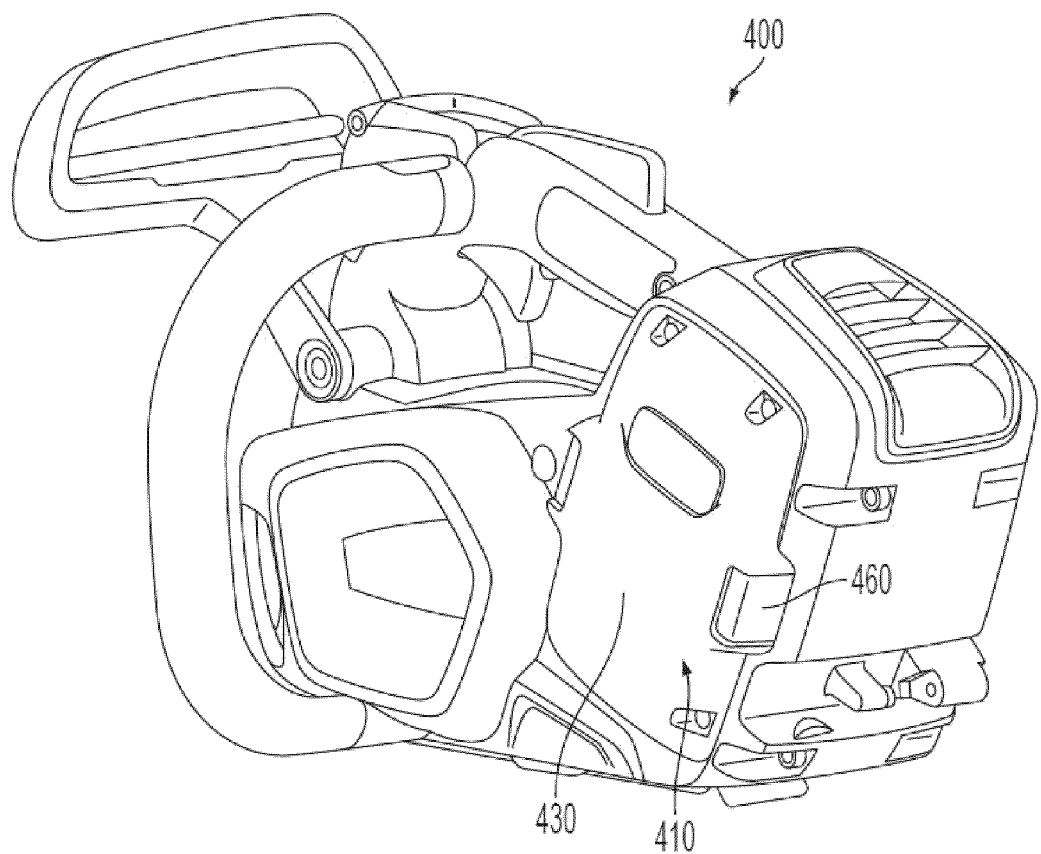
FIG. 4A illustrates a perspective view of an electric power tool according to another example embodiment.
Figure 4B:
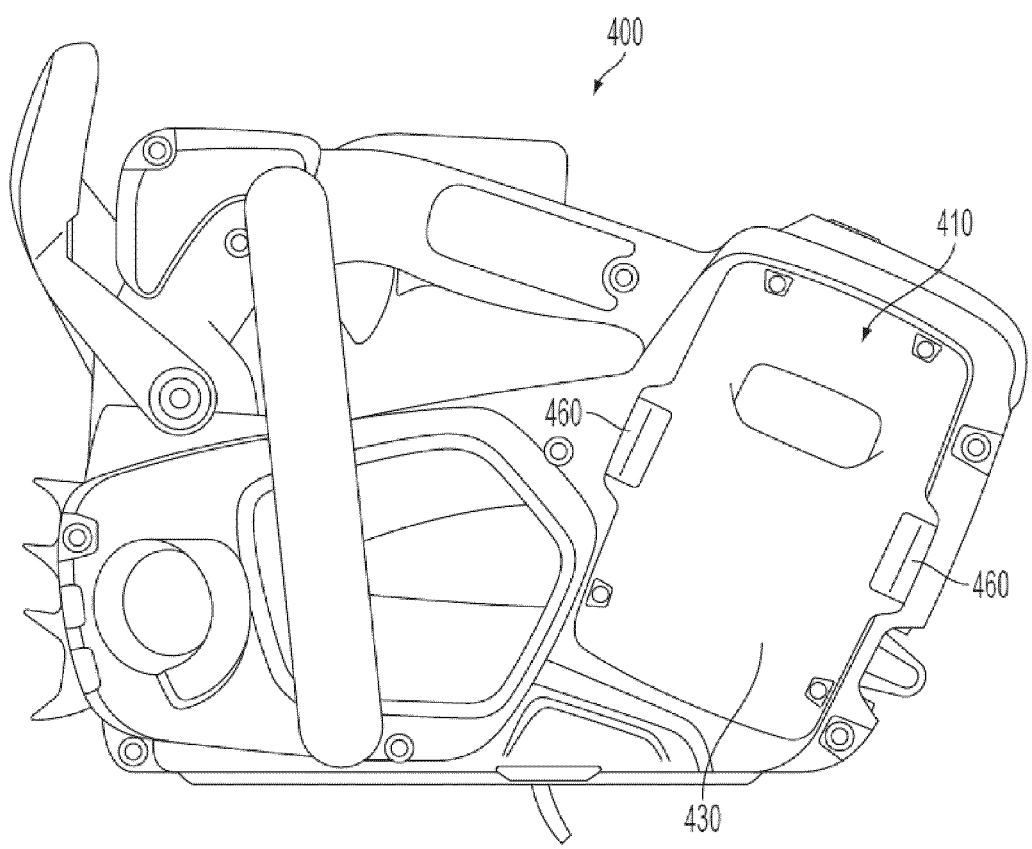
FIG. 4B illustrates a side elevation view of the electric power tool of FIG. 4A according to an example embodiment.
Figure 4C:
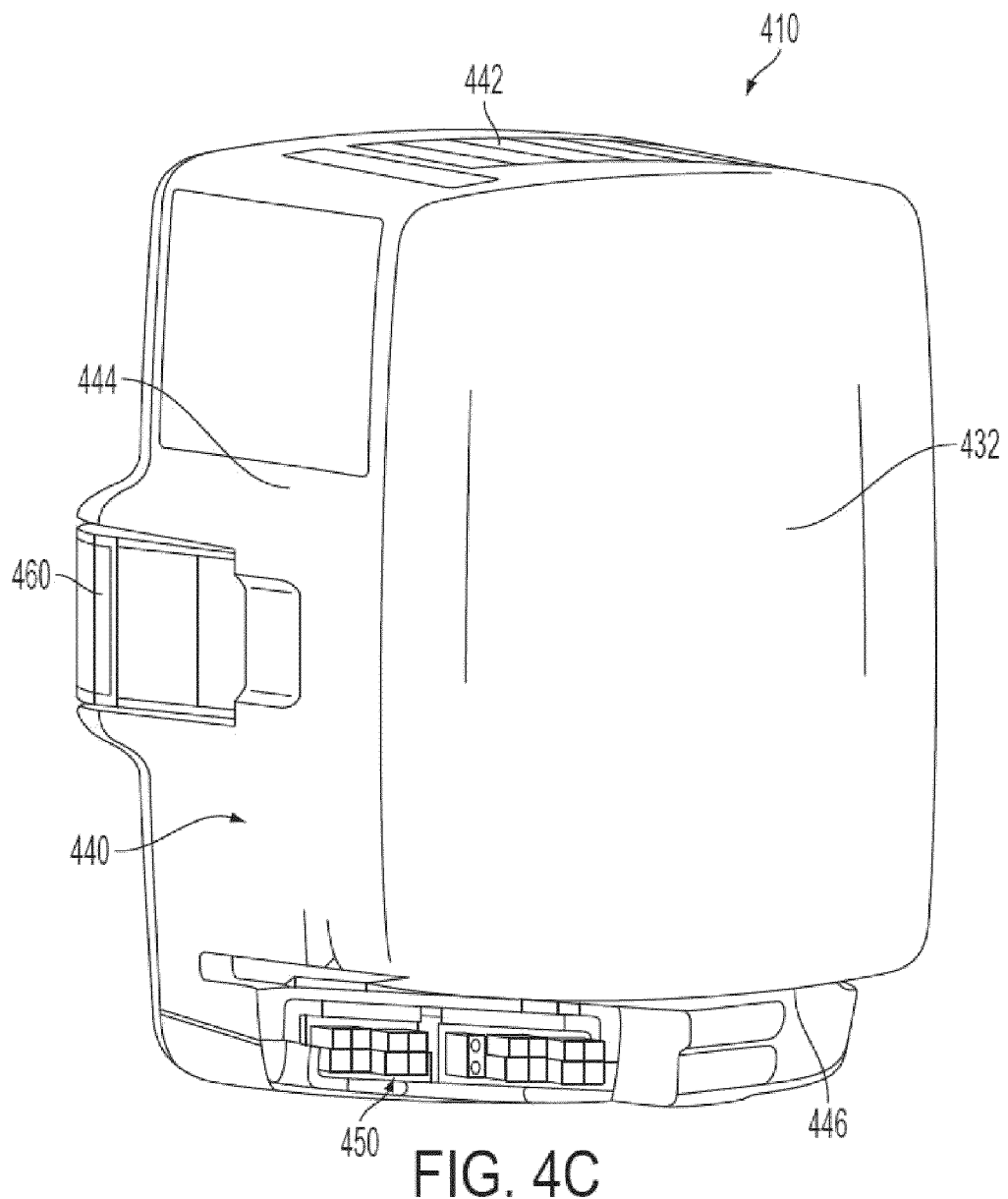
FIG. 4C illustrates a perspective view of the battery pack of the electric power tool of FIG. 4A according to an embodiment of the present invention.
Figure 4D:
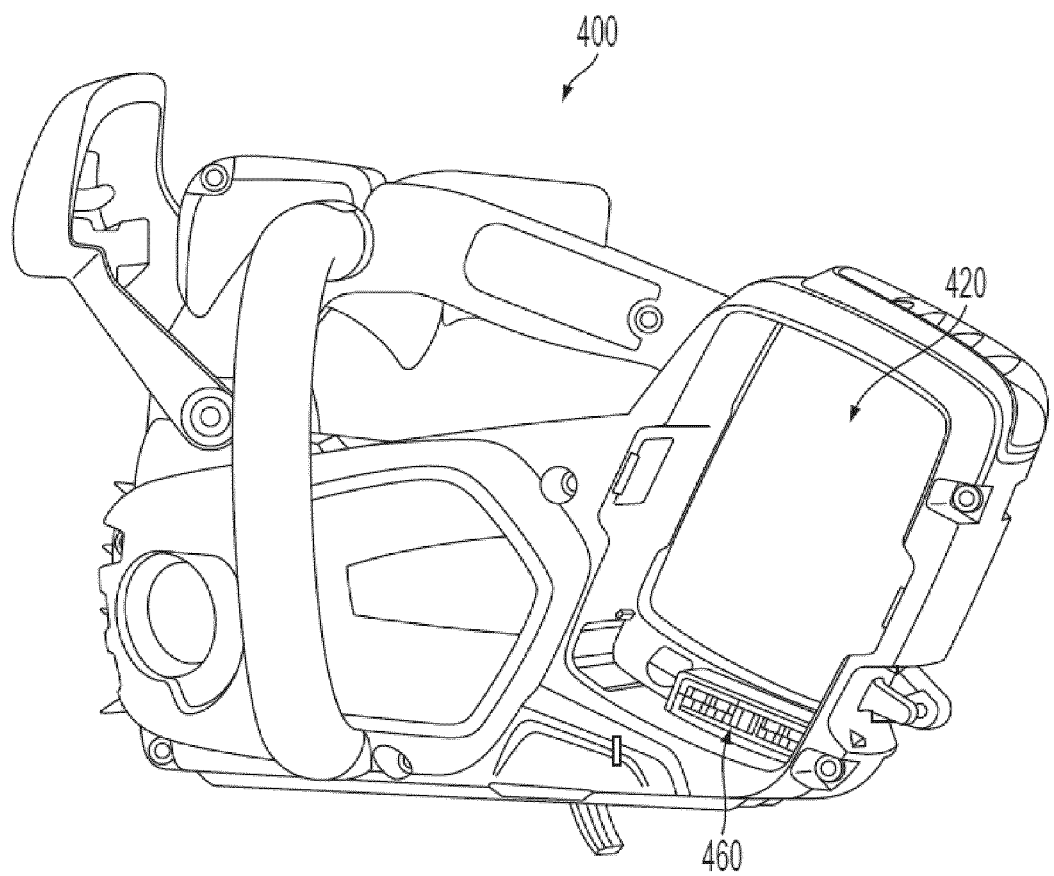
FIG. 4D illustrates a perspective view of the electric power tool of FIG. 4A with the battery pack removed according to an example embodiment.

FIG. 4A illustrates a perspective view of a tool body 400 of an electric power tool according to another example embodiment. FIG. 4B illustrates a side elevation view of the tool body 400 of the electric power tool according to an example embodiment. FIG. 4C illustrates a perspective view of a battery pack 410 of the electric power tool according to an embodiment of the present invention. FIG. 4D illustrates a perspective view of the tool body 400 of the electric power tool with the battery pack 410 removed to more clearly show features of the aperture 420 in the tool body 400 according to an example embodiment.

As can be seen from FIGS. 4A and 4B, the battery pack 410 is insertable into the aperture 420 that is a through aperture (e.g., passing entirely through the tool body 400 from left to right). As such, both a first end wall 430 of the battery pack 410 and a second end wall 432 of the battery pack 410 may be visible outside of the tool body 400. In an example embodiment, the second end wall 432 may be disposed opposite of the first end wall 430 relative to the cells of the battery pack 410 and may be exposed on the opposite side of the tool body 400 when the battery pack 410 is inserted into the aperture 420. However, in some embodiments, the aperture 420 may not be a through aperture that may pass entirely through the tool body 400. In such an embodiment, the second end wall 432 may not be exposed at the opposite end of the tool body 400, but may instead be positioned proximate to an interior wall of the tool body 400 forming a back wall or termination of the aperture.

The battery pack 410 of an example embodiment includes a sidewall assembly (shown generally at 440), which includes four sidewalls (three of which are visible in FIG. 4C, including sidewalls 442, 444 and 446). The sidewall assembly 440 forms an enclosure around all of the sides of the battery pack 410 that lie in a direction substantially parallel to the direction of insertion of the battery pack 410 into the aperture 420. Thus, together with the first and second end walls 430 and 432, the sidewall assembly 440 may form a housing to completely enclose the battery cells. Meanwhile, the aperture 420 may be defined by sidewalls configured to lie proximate to (and in some cases parallel to) the sidewalls of the sidewall assembly 440.

In an example embodiment, one portion of the sidewall assembly 440 (e.g., sidewall 446) may include an electrical connection assembly 450 disposed thereat and oriented to engage a connector 460 disposed in a corresponding sidewall of the aperture 420 when the battery pack 410 is moved in the direction of insertion to insert the battery pack 410 into the aperture 420. In some cases, the battery pack 410 may further include one or more fixing members 460 that may be snap fittings or other such devices configured to enable the battery pack 410 to be fixed in engagement with the tool body 400.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A battery pack for powering a battery powered tool, the battery pack comprising:
   a housing comprising a sidewall assembly, the sidewall assembly being configured to correspond to respective sidewalls of a battery compartment defined at a portion of the battery powered tool to facilitate insertion of the battery pack into the battery compartment, the sidewalls of the battery compartment forming a through aperture passing through and perpendicular to a longitudinal axis of a tool body of the battery powered configured to receive the battery pack;
   a plurality of cells disposed within the housing and arranged adjacent to each other such that the sidewall assembly, which extends along a direction substantially parallel to a direction of insertion of the battery pack into the battery compartment, forms an enclosure around the plurality of cells on all sides substantially parallel to the direction of insertion, the plurality of cells being electrically connected to each other to provide a combined output; and an electrical connection assembly disposed at a portion of the sidewall assembly to communicate the combined output to a connector disposed at a corresponding sidewall of the battery compartment, wherein the electrical connection assembly is arranged to engage the connector responsive to movement of the battery pack in a direction substantially parallel to the direction of insertion of the battery pack into the battery compartment.

2. The battery pack of claim 1, wherein the electrical connection assembly is disposed inside the housing on an interior portion of one sidewall of the sidewall assembly.

3. The battery pack of claim 1, wherein the electrical connection assembly is disposed outside the housing on an exterior portion of one sidewall of the sidewall assembly.

4. The battery pack of claim 3, wherein the electrical connection assembly is disposed in a recess disposed at the exterior portion.

5. The battery pack of claim 1, wherein the electrical connection assembly includes at least one protrusion or at least one protrusion receptacle that lies in a plane substantially parallel to a direction of insertion of the battery pack into the battery compartment.

6. The battery pack of claim 1, wherein the sidewall assembly includes at least four sidewalls, adjacent ones of which connect to each other at respective ends to enclose the plurality of cells.

7. The battery pack of claim 1, wherein opposite ends of the battery pack are exposed when inserted into the battery compartment.

8. The battery pack of claim 1, wherein opposite ends of the battery pack extend to be even with edges of the through aperture.

9. The battery pack of claim 1, wherein opposite ends of the battery pack extend beyond the edges of the through aperture.

10. A battery powered tool comprising:
a tool body,
a battery compartment comprising sidewalls forming a through aperture passing through and perpendicular to a longitudinal axis of the tool body, the through aperture being configured to receive a battery pack, and the battery compartment being configured to correspond to a sidewall assembly of the battery pack that is insertable into the battery compartment, the battery pack including a plurality of cells disposed within a housing and arranged adjacent to each other such that the sidewall assembly, which extends along a direction substantially parallel to a direction of insertion of the battery pack into the battery compartment, forms an enclosure around the plurality of cells on all sides substantially parallel to the direction of insertion, the plurality of cells being electrically connected to each other to provide a combined output; and
a connector disposed at a portion of one of the sidewalls, the connector being configured to communicate with an electrical connection assembly disposed at the sidewall assembly of the battery pack, the combined output being electrically communicable from the battery pack responsive to connection of the connector to the electrical connection assembly,
wherein the connector is arranged to engage the electrical connection assembly responsive to movement of the battery pack in a direction substantially parallel to the direction of insertion of the battery pack into the battery compartment.

11. The battery powered tool of claim 10, wherein the connector is configured to engage the electrical connection assembly inside the housing of the battery pack.

12. The battery powered tool of claim 11, wherein the connector is disposed at a block configured to engage a recess disposed at a sidewall of the battery pack.

13. The battery powered tool of claim 10, wherein the connector is configured to engage the electrical connection assembly outside the housing of the battery pack.

14. The battery powered tool of claim 13, wherein the connector is disposed at a block configured to engage a recess disposed at a sidewall of the battery pack.

15. The battery powered tool of claim 14, wherein the block and the recess engage each other at respective faces that are disposed substantially perpendicular to the direction of insertion and the respective faces are disposed at a position about 25% to 75% of a full depth of the aperture and about 25% to 75% of a full length of the sidewall assembly, respectively.

16. The battery powered tool of claim 14, wherein the one of the sidewalls at which the block is disposed is differently shaped than other sidewalls of the aperture.

17. The battery powered tool of claim 10, wherein the connector includes at least one protrusion or at least one protrusion receptacle that lies in a plane substantially parallel to a direction of insertion of the battery pack into the battery compartment.

18. The battery powered tool of claim 17, wherein the sidewall assembly includes at least four sidewalls, adjacent ones of which connect to each other at respective ends to enclose the plurality of cells.

19. A battery powered tool comprising:
a tool body;
a battery pack including a housing at least partially enclosing a plurality of cells disposed within the housing, the plurality of cells being electrically connected to each other to provide a combined output, the housing comprising a sidewall assembly;
a battery compartment comprising compartment sidewalls that correspond to the sidewall assembly, the component sidewalls forming a through aperture passing through and perpendicular to a longitudinal axis of the tool body of the battery powered tool, the through aperture being configured to receive the battery pack, and the sidewall assembly extending along a direction substantially parallel to a direction of insertion of the battery pack into the battery compartment to form an enclosure around the plurality of cells on all sides substantially parallel to the direction of insertion;
a connector disposed at one of the compartment sidewalls; and
an electrical connection assembly disposed at a portion of the sidewall assembly to communicate the combined output to the connector responsive to connection of the connector to the electrical connection assembly via insertion of the battery pack into the battery compartment,
wherein the connector is arranged to engage the electrical connection assembly responsive to movement of the battery pack in the direction of insertion of the battery pack into the battery compartment.

20. The battery powered tool of claim 19, wherein the connector is configured to engage the electrical connection assembly inside the housing of the battery pack.

21. The battery powered tool of claim 19, wherein the connector is configured to engage the electrical connection assembly outside the housing of the battery pack.

22. The battery powered tool of claim 21, wherein the connector is disposed at a block configured to engage a recess disposed at a sidewall of the battery pack.

23. The battery powered tool of claim 22, wherein the block and the recess engage each other at respective faces that are disposed substantially perpendicular to the direction of insertion and the respective faces are disposed at a position about 25% to 75% of a full depth of the aperture and about 25% to 75% of a full length of the sidewall assembly, respectively.

24. The battery powered tool of claim 23, wherein the sidewall assembly includes at least four sidewalls, adjacent ones of which connect to each other at respective ends to enclose the plurality of cells.

25. The battery powered tool of claim 22, wherein the one of the compartment sidewalls at which the block is disposed is differently shaped than other compartment sidewalls of the battery compartment.

26. The battery powered tool of claim 19, wherein the connector includes at least one protrusion or at least one protrusion receptacle that lies in a plane substantially parallel to a direction of insertion of the battery pack into the battery compartment.

* * * * *